F. CLEMENS, Jr.
CHECK VALVE FOR SEWERS.
APPLICATION FILED DEC. 16, 1908.
922,262.
Patented May 18, 1909.
2 SHEETS—SHEET 1.
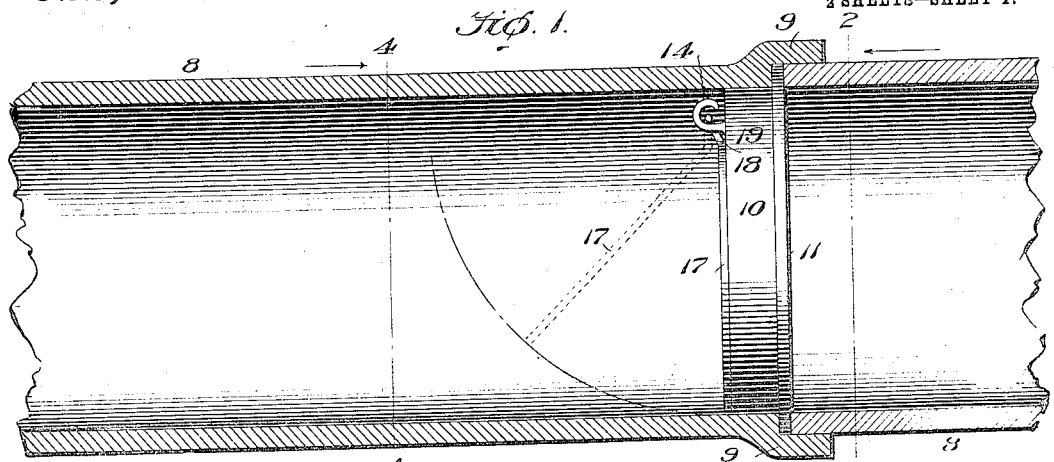
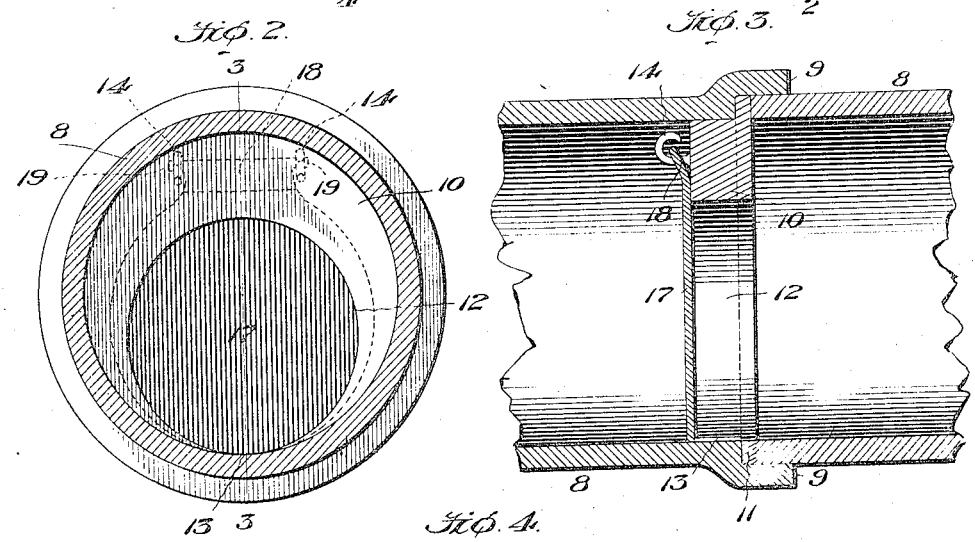
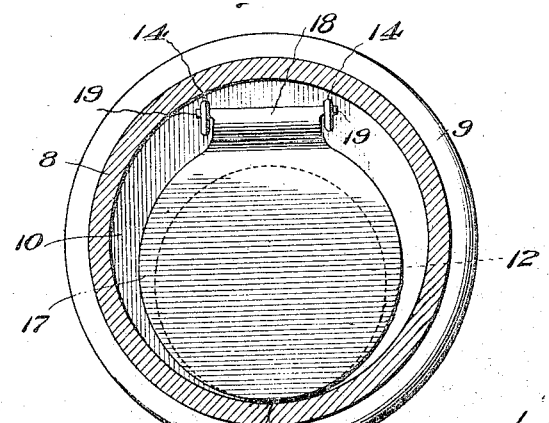

F. CLEMENS, Jr.
CHECK VALVE FOR SEWERS.
APPLICATION FILED DEC. 16, 1908.
922,262.
Patented May 18, 1909.
2 SHEETS—SHEET 2.
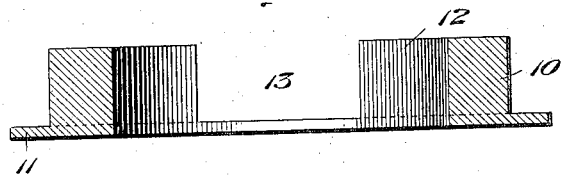
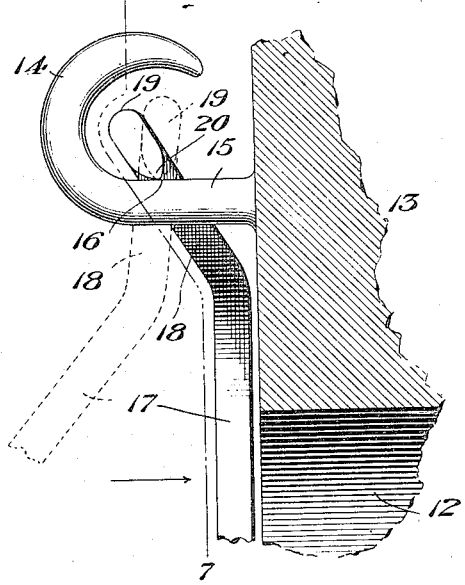
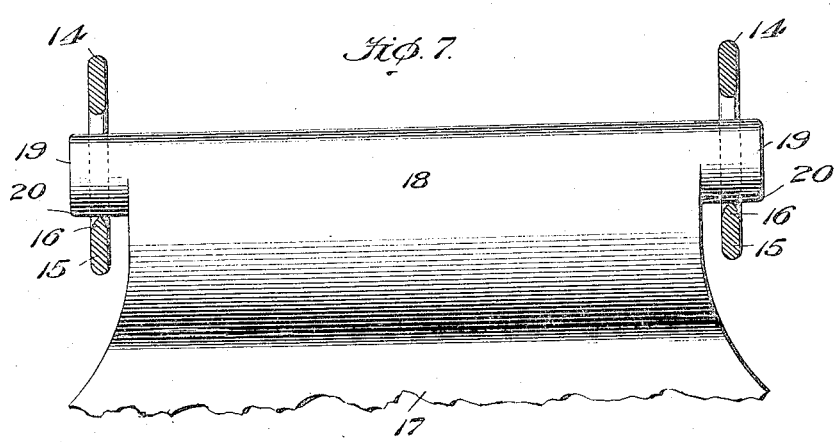
Witnesses
William W. Beane
Inventor
Frank Clemens, Jr.
By
Attorney

UNITED STATES PATENT OFFICE.

FRANK CLEMENS, JR., OF CRESTLINE, OHIO.

CHECK-VALVE FOR SEWERS.

No. 922,262.

Specification of Letters Patent.

Patented May 18, 1909.

Application filed December 16, 1908. Serial No. 467,756.

*To all whom it may concern:*

Be it known that I, FRANK CLEMENS, Jr., a citizen of the United States, residing at Crestline, in the county of Crawford and State of Ohio, have invented certain new and useful Improvements in Check-Valves for Sewers, of which the following is a specification.

The present invention relates to means for permitting the flow of water and material in one direction through a sewer, but preventing back flow.

The primary object of the present invention is to provide an exceedingly simple but thoroughly practical structure, which can be readily placed in a sewer pipe, and while permitting the free flow of sewage or other material in one direction through the pipe, will entirely prohibit any back flow.

The preferred form of construction is illustrated in the accompanying drawings, wherein:—

Figure 1 is a longitudinal sectional view through a portion of a sewer, showing the valve in place therein. Fig. 2 is a cross sectional view substantially on the line 2—2 of Fig. 1. Fig. 3 is a sectional view on the line 3—3 of Fig. 2. Fig. 4 is a cross sectional view on the line 4—4 of Fig. 1. Fig. 5 is an enlarged detail horizontal sectional view through the body. Fig. 6 is a detail view on an enlarged scale of one of the valve bearings. Fig. 7 is a detail sectional view substantially on the line 7—7 of Fig. 6.

Similar reference numerals designate corresponding parts in all the figures of the drawings.

As shown more particularly in Figs. 1, 2 and 3, the device is intended to be inserted in a sewer at the juncture of two of the pipes, said pipes being designated by the reference numeral 8, and one having a bell 9 that receives the adjacent end of the other. The device consists of a body 10 of metal or other material that will not corrode, rust or be otherwise injuriously affected by liquids or gases. This body is circular in cross section so that it will fit snugly within the end of the pipe having the bell, in which it is preferably secured by cement or other means. This body furthermore has at one end an outstanding circular flange 11 that fits snugly within the bell 9, and is abutted against by the end of the adjacent pipe, as shown. The said body has a circular passageway 12 therethrough that is disposed eccentrically, and cuts through the bottom of the body, as will be clear by reference to Figs. 4 and 5. This open bottom 13 is, however, closed by the bottom of the pipe. In other words, the bottom of the passageway is formed by the bottom of the pipe, as will be evident.

Projecting from the rear or inner end of the body is a pair of hooks 14, which, as shown more particularly in Fig. 7, have the upper portions of their shanks 15 upwardly tapered to produce bearing edges 16. A check valve 17, preferably a comparatively thin plate, is provided with an upstanding portion 18 that is slightly offset and has oppositely extending pintles 19 that are engaged in the hooks. As shown in Fig. 6 the pintles have their lower portions tapered to produce bearing edges 20, which rest upon the bearing edges 16. With this construction, it will be evident that sewage or other material can flow freely through the pipes in one direction, but all back flow will be prohibited, as the valve will close against the inner end of the body and prevent the retrograde flow of material through the passageway. The adjacent faces of the body and valve are made perfectly true in order that no back leakage can take place.

There are a number of decided advantages for the structure. In the first place, it can be readily placed in position, as will be evident. Furthermore it will constitute no serious obstruction to the flow of comparatively heavy material, inasmuch as there is no shoulder or projection upon the bottom of the sewer, the cut-away portion 13 of the body exposing the bottom of the pipe. The particular type of bearing is also advantageous, in that it makes the valve very sensitive in action. Finally it will be obvious that the device can be cheaply manufactured.

From the foregoing, it is thought that the construction, operation and many advantages of the herein described invention will be apparent to those skilled in the art, without further description, and it will be understood that various changes in the size, shape, proportion and minor details of construction may be resorted to without departing from the spirit or sacrificing any of the advantages of the invention.

Having thus fully described my invention, what I claim as new, and desire to secure by Letters Patent, is:—

1. A device of the character described, comprising a body having a portion arranged to fit within a pipe and having a passageway therethrough, the passageway opening through the bottom of the portion of the body that fits within the pipe, said passage way thus having for a bottom the under side of said pipe, and a check valve mounted on the body and controlling the flow of material through the passageway.

2. A device of the character described, comprising a circular body arranged to be fitted within a pipe and having a passageway extending through said body from end to end and opening through the bottom, the bottom of the pipe thus constituting the bottom of said passageway, said body having an outstanding flange at one end that completely surrounds the passageway and is arranged to be placed between adjacent pipes, and a check valve pivotally hung from the other end and normally extending across the passageway.

3. A device of the character described, comprising a body arranged to be fitted within a pipe and having an outstanding pivot hook on the upper portions of one end, said body also having a passageway therethrough, a check valve hung from the hook and having a bearing thereon, the upper side of said hook and the under side of the bearing being oppositely tapered and disposed in angular relation to produce engaging bearing edges.

4. A device of the character described, comprising a circular body arranged to be fitted within a pipe and having an eccentrically disposed passageway therethrough, said passageway opening through the bottom of the body, the bottom of the pipe constituting the bottom of the passageway, an outstanding flange carried by one end of the body and being arranged to fit between the ends of adjacent pipes, outstanding hooks projecting from the other end of the body and having their shanks tapered upwardly to provide bearing edges, and a check valve having oppositely extending pintles that engage the hooks, said pintles having their lower portions tapered to produce bearing edges, which are disposed at right angles to and rest against the bearing edges of the shanks and said valve normally closing the passageway.

In testimony whereof I hereunto affix my signature in the presence of two witnesses.

FRANK CLEMENS, Jr.

Witnesses:
M. A. FLYNN,
SAMUEL EASTERDAY.